(12) United States Patent
Zimmer et al.

(10) Patent No.: US 8,840,170 B2
(45) Date of Patent: Sep. 23, 2014

(54) INNER GARNISH ASSEMBLY MODULE SYSTEM

(75) Inventors: John Zimmer, Canton, MI (US); Rod Bara, Rochester Hills, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 1155 days.

(21) Appl. No.: 12/666,305

(22) PCT Filed: Jun. 30, 2008

(86) PCT No.: PCT/US2008/068823
§ 371 (c)(1),
(2), (4) Date: Nov. 17, 2011

(87) PCT Pub. No.: WO2009/006425
PCT Pub. Date: Jan. 8, 2009

(65) Prior Publication Data
US 2012/0091746 A1    Apr. 19, 2012

Related U.S. Application Data

(60) Provisional application No. 60/937,825, filed on Jun. 29, 2007.

(51) Int. Cl.
*B60J 10/08* (2006.01)
*B60J 10/00* (2006.01)
*B60R 13/02* (2006.01)

(52) U.S. Cl.
CPC ............ *B60J 10/0031* (2013.01); *B60J 10/086* (2013.01); *B60J 10/0022* (2013.01); *B60R 13/02* (2013.01); *B60J 10/0051* (2013.01); *B60J 10/088* (2013.01); *B60R 2013/0287* (2013.01); *B60R 13/0243* (2013.01); *B60J 10/0062* (2013.01); *B60J 10/081* (2013.01)
USPC .......................... 296/146.9; 296/1.08; 49/502

(58) Field of Classification Search
CPC ....... B60R 13/04; B60J 5/0402; B60J 5/0468; B60J 10/085; B60J 10/088; B60J 10/008
USPC ................ 296/146.9, 146.2, 93, 1.08; 49/502
See application file for complete search history.

(56) References Cited

U.S. PATENT DOCUMENTS 5,072,546 A    12/1991 Ogawa
5,702,148 A    12/1997 Vaughan et al.
(Continued)

FOREIGN PATENT DOCUMENTS

EP       1 522 445 A2    4/2005
JP       2007-55516      3/2007

OTHER PUBLICATIONS

International Search Report and Written Opinion for PCT/US2008/068823.

(Continued)

*Primary Examiner* — Jason S Morrow
(74) *Attorney, Agent, or Firm* — Fay Sharpe LLP

(57) ABSTRACT

A one-piece inner garnish assembly module system (MS) joins an inner garnish molding (IG), primary seal (PS), glass run (GR), and inner beltline weatherstrip (IB) into a single component prior to installation of the module system on a vehicle. The garnish is secured to the glass run along the A and B pillars, and the interconnecting header portion of a vehicle door. In addition, the primary seal is operatively associated or secured to the garnish, and may be pin-mounted to the door, or mechanically connected, and/or adhesively secured to the door.

18 Claims, 6 Drawing Sheets

(56) References Cited

U.S. PATENT DOCUMENTS

| | | | |
|---|---|---|---|
| 5,743,047 A | 4/1998 | Bonne et al. | |
| 6,389,751 B1 | 5/2002 | Wang | |
| 6,389,752 B1 | 5/2002 | Rosenau | |
| 6,409,251 B1* | 6/2002 | Kaye et al. | 296/146.9 |
| 6,811,194 B1* | 11/2004 | Gaertner et al. | 296/1.08 |
| 8,205,389 B1* | 6/2012 | Kesh | 49/440 |
| 2003/0042755 A1* | 3/2003 | Nozaki | 296/146.9 |
| 2005/0187689 A1 | 8/2005 | Westerhoff | |
| 2007/0187988 A1* | 8/2007 | Koshimichi | 296/146.9 |
| 2007/0262607 A1* | 11/2007 | Saito | 296/146.2 |
| 2008/0282617 A1 | 11/2008 | Zimmer et al. | |
| 2009/0152894 A1* | 6/2009 | Kang | 296/146.9 |
| 2009/0178343 A1 | 7/2009 | Zimmer et al. | |
| 2011/0204671 A1* | 8/2011 | Baratin | 296/93 |
| 2012/0091751 A1* | 4/2012 | Zimmer et al. | 296/146.9 |
| 2013/0057009 A1* | 3/2013 | Turicik et al. | 296/1.08 |

OTHER PUBLICATIONS

Application No. EP 08 78 1195 Supplementary European Search Report, mailed May 6, 2013.

Japanese Patent Application 2010-515227, mailed Sep. 4, 2013.

* cited by examiner

INNER GARNISH ASSEMBLY MODULE SYSTEM

CROSS-REFERENCE TO RELATED APPLICATIONS

This application claims priority from U.S. provisional application Ser. No. 60/937,825, filed 29 Jun. 2007, the disclosure of which is expressly incorporated herein by reference.

This application also relates to commonly owned International Patent Application No. PCT/US2005/042159 (International Filing Date: Nov. 18, 2005) entitled "Inner Garnish Assembly", a national filing of which is presently in the U.S. as Ser. No. 11/631,712. The disclosure of this co-pending application is expressly incorporated herein by reference.

BACKGROUND OF THE DISCLOSURE

As noted in the co-pending '712 application, there is an ever increasing need to remove costs associated with the assembly of vehicles, and particularly with respect to vehicle components. As detailed in that application, the assignee of the present application has developed an inner garnish assembly that integrates an inner beltline weatherstrip and a glass seal assembly. The glass seal assembly extends about the A-pillar, header portion, and B-pillar portions of a door window opening to effectively seal about the perimeter of the window. In addition, the inner beltline weatherstrip extends along a lower perimeter edge of the window opening, and molded transition members (sometimes referred to as muckets) are provided at opposite ends of the inner belt for joining to the garnish assembly.

Assembly of automotive vehicles includes different components requiring separate operators to install or assemble these components as the vehicle proceeds through the assembly line. Thus, by way of example, a first operator installs a primary seal. A separate, second operator installs a glass run. A third operator installs the inner belt. Last, a fourth operator installs the garnish. As will be appreciated, each of these operators adds significantly to the overall cost of the vehicle. Thus, a tremendous savings is attainable by the OEM if the number of operators is likewise significantly reduced.

In addition, bringing a number of these components together as a pre-assembled module that is supplied to the OEM reduces tolerance stack-up issues. The module provides for a better fit of what used to be individual components on the vehicle, as well as a cleaner look and styling of the final assembly.

Further, these different components each require a separate attachment arrangement for securing the individual component to the vehicle. Consequently, limiting the total number of attachment points for the component(s) is also desirable since limited attachment points assist in simplifying the vehicle structure.

Still further cost reductions are associated with the OEM door construction.

Thus, a need exists for an assembly or module system that overcomes these deficiencies and others in a manner that is efficient, cost effective, enhances overall appearance, and significantly reduces complexity.

SUMMARY OF THE DISCLOSURE

An inner or interior garnish assembly module system joins an inner garnish trim or molding, to at least one of, and in one arrangement all of, a primary door seal, glass seal or glass run, and inner beltline weatherstrip prior to installation of the module system on an associated vehicle.

The module system includes a primary door seal and inner garnish trim that are secured together as a subassembly prior to installation on an associated vehicle. In one preferred embodiment thereof, the inner garnish trim extends along first and second pillar portions (either A and B pillars, or B and C pillars) and an interconnecting header portion, and is mechanically connected to a primary door seal as a subassembly prior to installation of the subassembly to the associated vehicle door.

In one preferred arrangement, the inner garnish trim and the primary door seal are mechanically snapped together to form the subassembly and then the subassembly is adhesively secured or secured with tape to the associated vehicle door.

The tape is preferably located between the primary door seal and the associated vehicle door adjacent the interconnection between the inner garnish trim and the primary door seal.

The inner garnish trim is further mechanically engaged to the associated vehicle door at a location spaced from the primary door seal.

In another preferred arrangement, the inner garnish trim and the primary door seal are connected together with pins to form the subassembly, and the pins also function to secure the subassembly to the associated vehicle door.

The pins are connected to the primary door seal and then the inner garnish trim is secured to the primary door seal via the pins to form the subassembly prior to the pins securing the subassembly to the associated vehicle door.

The module system further includes an inner glass secondary seal secured to the module, particularly to the inner garnish trim at a region spaced from the primary door seal. The inner glass secondary seal preferably includes at least one seal lip of the module that is mounted for sliding sealing engagement with an inner surface of the associated window and adjacent a glass run portion that has a base region and first and second legs extending outwardly from the base region in a generally U-shaped configuration. Seal lips preferably extend from at least the first and second legs of the glass run to sealingly engage surfaces of the movable window. The seal lips of the glass run and the inner glass secondary seal include a low friction surface, and other regions of the glass run may include a hard material that demonstrates improved wear characteristics.

Additionally, an anti-trap sensor/switch assembly may be incorporated into the modular system.

The anti-trap switch/sensor assembly is preferably incorporated into the module as a part of the inner glass secondary seal, and more preferably adjacent the seal lip thereof.

The garnish portion of the module system may be color-keyed to the vehicle interior and may include a grained finish for aesthetics.

A method of assembling an inner garnish trim module includes providing an inner garnish trim, and joining a primary door seal to the inner garnish trim to form a subassembly prior to installing the subassembly to an associated vehicle door.

The inner garnish trim is preferably mechanically joined to the primary door seal, and the subassembly is preferably taped or pinned to the associated vehicle door.

An inner glass secondary seal is preferably to the module system in one embodiment.

An anti-trap sensor/switch assembly is incorporated into the inner glass secondary seal in another preferred arrangement.

The method may further include joining a belt line seal to the module system.

A primary benefit of the present disclosure relates to a one-piece, unitary structure that achieves a dramatic reduction in the number of parts, material handling, shipping, assembly time and costs associated with labor (installation).

There is also the added benefit of cost savings associated with a single source that supplies the inner garnish modular system.

Still another benefit relates to the inner fit of the components that were previously separate.

Yet another advantage is the ability to provide a one-piece structure that satisfies the design and engineering criteria associated with prior, individual components.

Still other benefits and advantages of the invention, in addition to the enhanced performance, appearance, and assembly labor savings, will become apparent to those skilled in the art upon reading and understanding the following detailed description.

DETAILED DESCRIPTION OF THE PREFERRED EMBODIMENTS

Figure 1:
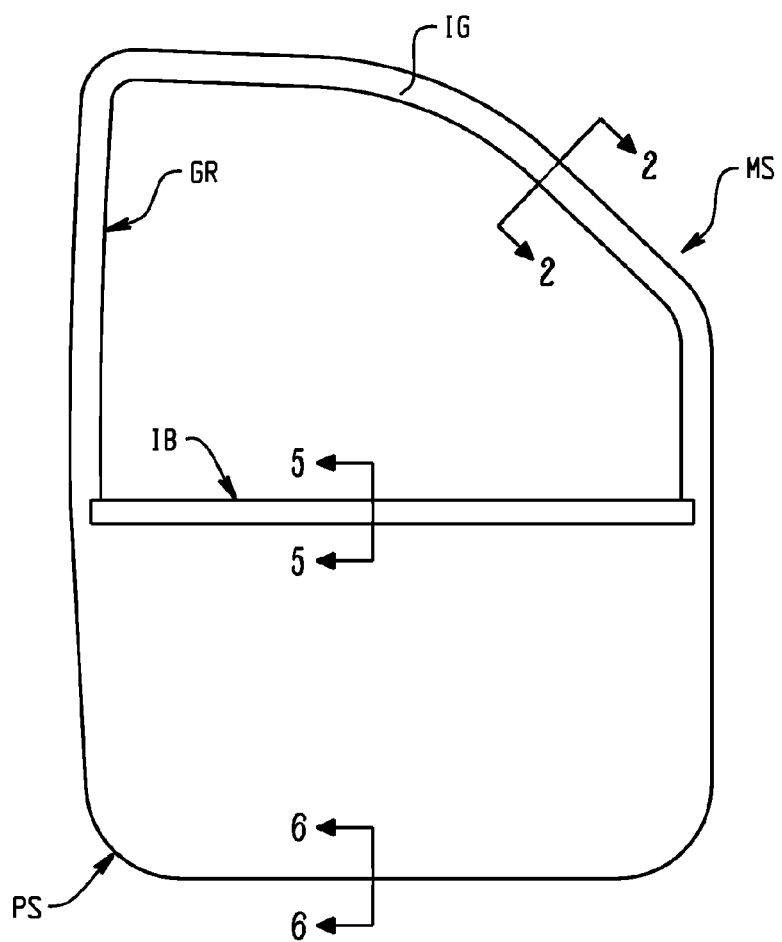
FIG. 1 is a plan view of a first preferred embodiment of an inner garnish assembly module system.

An inner garnish/primary seal sub-assembly or module system MS is shown in FIG. 1. The module system includes at least an inner garnish member or trim IG, and a primary door seal PS. In addition, the module system may include a window or glass seal such as a secondary inner glass seal GS, an anti-trap switch/sensor ATS, and an inner beltline weatherstrip IB. As is generally known in the art, an automotive vehicle door 50 includes a window opening where a window W is movable relative to the opening via a manual or powered regulator: it becomes necessary to seal about the window along A-pillar, B-pillar, and an interconnecting header region, for example, when the window is disposed in a first or raised position. In addition, the inner beltline weatherstrip IB provides a seal interface between the door and the interior surface of the window along the belt line.

Figure 2:
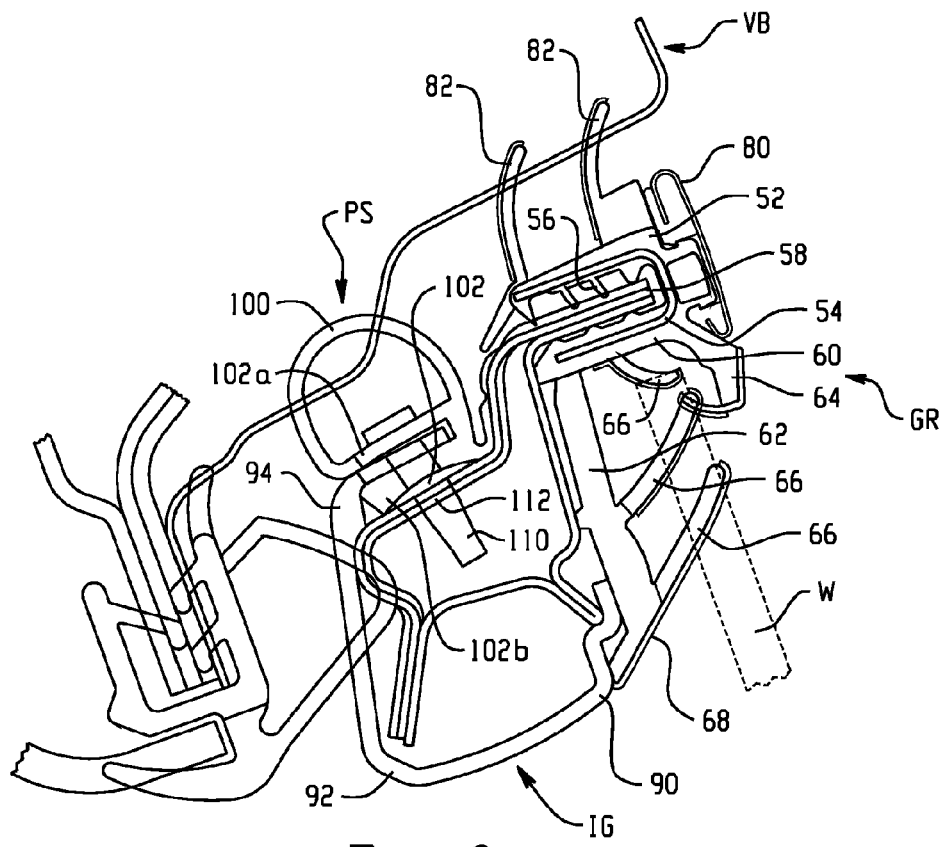
FIG. 2 is a cross-sectoral view taken generally along lines 2-2 of FIG. 1.
Figures 3, 4:
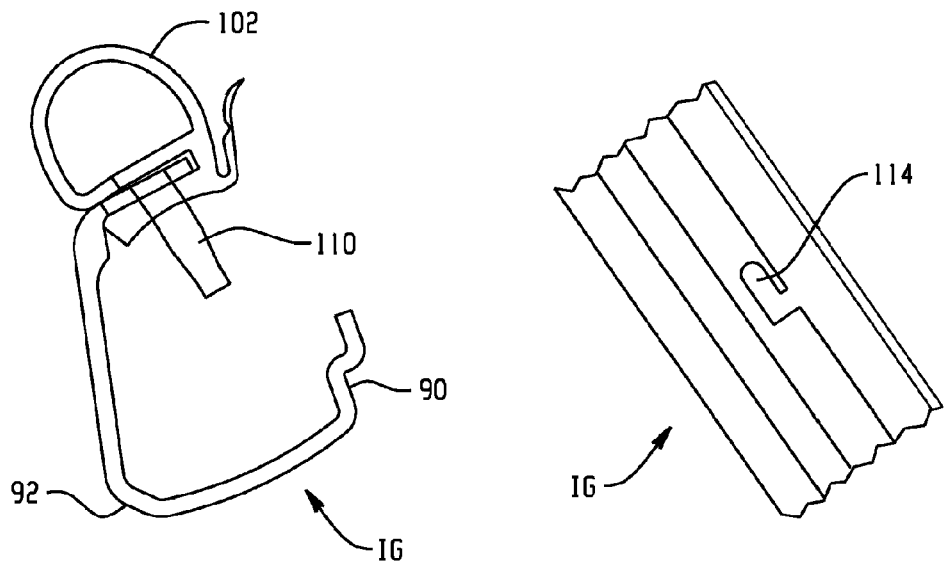
FIG. 3 illustrates just the inner garnish/primary seal subassembly in cross-section, again, taken generally along lines 2-2 of FIG. 1.
FIG. 4 is a view taken generally in the direction of reference 4 of FIG. 2.

With additional reference to FIGS. 2-4, there are shown portions of the vehicle door 50 to which is secured a glass run GR including a mounting portion 52 formed by a rigid core 54, for example, that is encapsulated in an elastomeric material and includes retaining fingers 56 that grippingly engage a flange 58. The glass run GR further includes a generally U-shaped portion defined by a base 60 and first and second legs 62, 64 extending therefrom. Each of the legs or base preferably has one or more seal lips 66 with low friction surfaces 68 disposed thereon for selective sealing engagement with a perimeter edge of the window W. A show surface 80 is preferably separately mounted on the mounting portion or formed as a part of the assembly, while additional seal lips 82 are provided for engagement with a portion of the vehicle body VB when the door is closed relative to the vehicle body.

The inner garnish trim IG includes a first portion 90 having a conformation intended for cooperative gripping engagement with a portion of the door 50, for example around a flange of the door panel and beneath the first leg 62 of the glass run. An intermediate region 92 of the inner garnish covers an otherwise exposed portion of the vehicle door metal 50 and merges with a primary seal attachment or mounting portion 94. Particularly, the primary door seal PS includes a hollow seal bulb portion 100 that extends outwardly from a base 102 defined by a pair of spaced legs 102a, 102b. The spaced legs are configured to receive a leg of the primary seal mounting portion 94 of the inner garnish. More particularly, the base regions 102a, 102b and the mounting leg 94 of the inner garnish include aligned openings (unnumbered) adapted to receive fastener 110 therethrough, and which fastener also passes through opening 112 in the door metal 50 to secure the primary seal and inner garnish at spaced perimeter locations on the door. As will be appreciated from FIG. 1 these fasteners extend through both the primary seal and the inner garnish along the A-pillar, B-pillar, and the header portion. At those regions below the inner belt, a more standard fastener (i.e., a fastener that is not modified to simultaneously secure two components such as the primary seal and the garnish to the vehicle door) is used to secure the primary seal at spaced locations evidenced by the crossing lines along the lower portion of the primary seal as shown in FIG. 1. Of course, one of ordinary skill in the art will recognize that other manners of securing the primary seal may be used such as an adhesive tape without departing from the scope and intent of the present disclosure.

As further evident in FIGS. 3 and 4, the garnish and primary door seal cooperate with the fastener 110 to simultaneously secure the weatherstrip or primary door seal PS to the garnish IG to form a subassembly, and then to secure the primary seal/garnish subassembly to the door. As particularly shown in FIG. 4, the inner garnish preferably includes elongated slot-shaped openings in those regions of the garnish above the belt. The elongated openings 114 permit the primary seal to be slightly stretched between fastening points and also allow for tolerance build-up or slippage. The fastener is mounted to the upper and lower legs 102a, 102b of the base and the elongated openings 114 allow the garnish to be assembled to the primary door seal by sliding transversely through the side access 114a of the opening.

Figure 5:
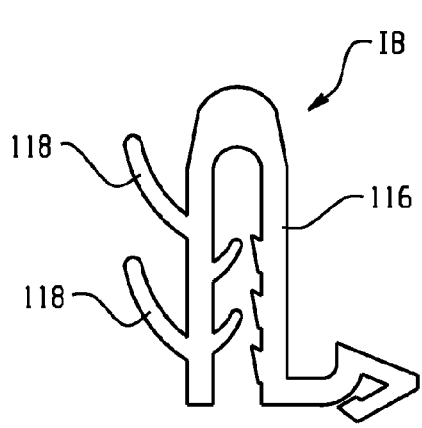
FIG. 5 is a cross-sectional view of the inner beltline weatherstrip taken generally along the lines 5-5 of FIG. 1.
Figure 6:
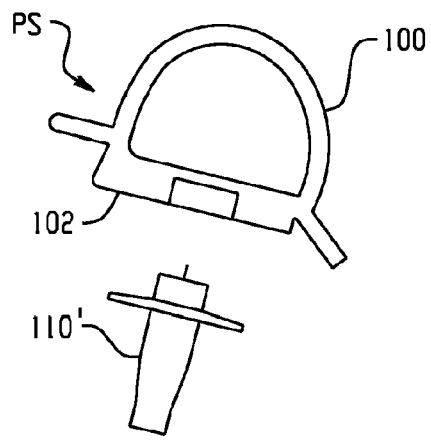
FIG. 6 is an exploded cross-sectional view of the primary seal and associated fastener taken generally along the lines 6-6 of FIG. 1.

As is seen in FIG. 5, the inner belt IB is a generally conventional structure, including a rigid core 116 encapsulated in an elastomeric material to grip along a door flange. In this manner, seal lips 118 are positioned for sliding, sealing, and engagement with an inner surface of the movable window. FIG. 6, on the other hand, particularly illustrates use of a conventional fastener 110' that cooperates with the hollow seal bulb 100 of the primary door seal PS and particularly the base region 102 thereof to secure the primary door seal to the associated vehicle door.

Figure 7:
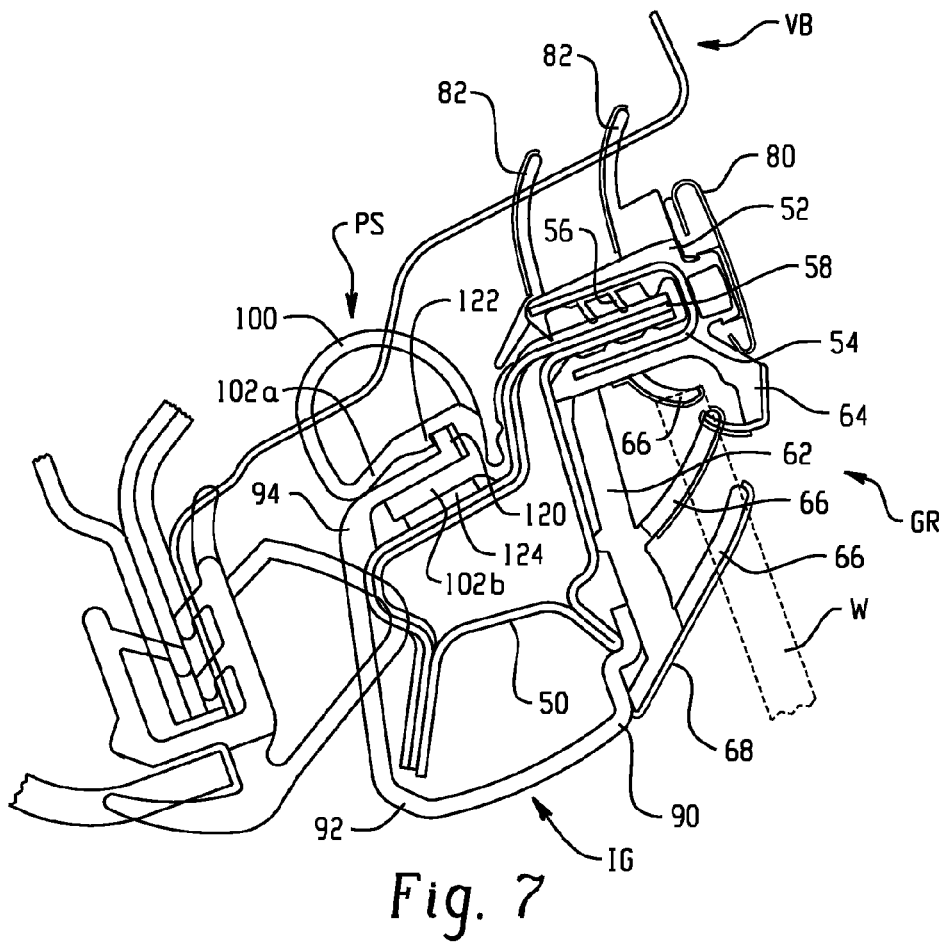
FIG. 7 is a cross-sectional view of a second preferred arrangement of an inner garnish/primary seal subassembly taken generally along the lines 2-2 of FIG. 1.
Figure 8:
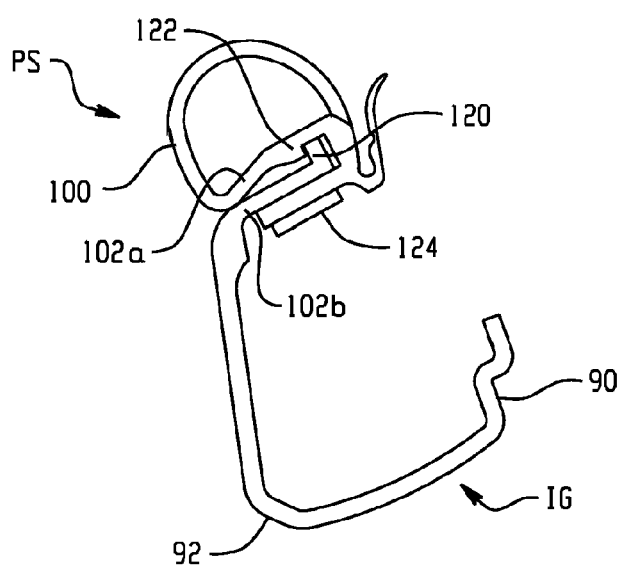
FIG. 8 illustrates only the inner garnish/primary seal subassembly of FIG. 7 taken generally along the lines 2-2 of FIG. 1.

A second preferred embodiment of the inner garnish/primary seal subassembly or module and its cooperation with the glass run GR and vehicle door to form a single-piece modular system is shown in FIGS. 7 and 8. Rather than using a fastener such as pin 110 described in the embodiment of FIGS. 2-4, here the inner garnish and primary seal subassembly are mechanically interconnected and the subassembly subsequently adhesively secured or taped to the door. For ease of reference, like numerals will refer to like elements and only the new components will include new numerals. Thus, the inner garnish IG has a modified connecting region 94 including an upturned leg 120 that snap-fits or locks with shoulder 122 that extends inwardly from one of the legs 102a, 102b toward the other leg of the base of the primary door seal. Tape 124 is then preferably provided along the base 102 of the primary seal, preferably along the underside of leg 102b to secure the subassembly to the door. Opposite end 90 of the inner garnish still interconnects with the glass run GR in a manner as previously described with respect to FIG. 2. Likewise, for purposes of consistency and brevity, the remaining structure is also shown to be the same.

Figure 9:
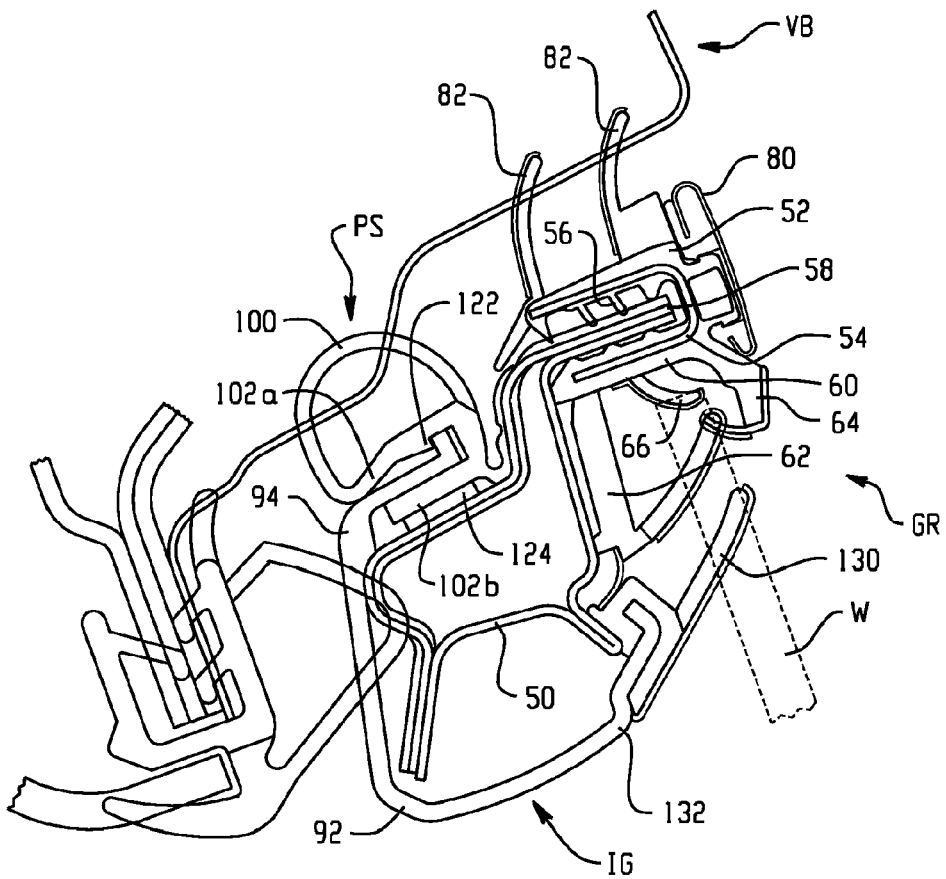
FIG. 9 is a cross-sectional view of a third preferred embodiment of an inner garnish/primary seal subassembly taken generally along the lines 2-2 of FIG. 1.
Figure 10:
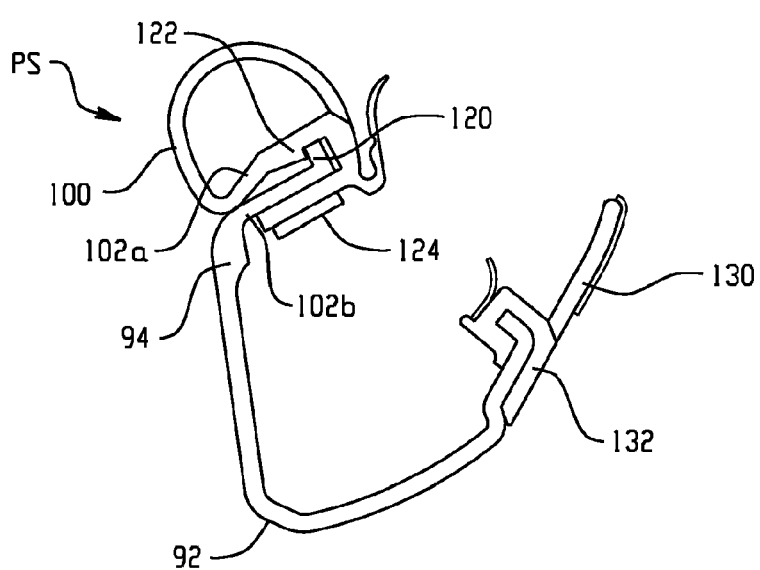
FIG. 10 illustrates only the inner garnish primary seal subassembly of FIG. 9 also taken generally long lines 2-2 of FIG. 1.

A third preferred arrangement of the inner garnish trim/primary door seal sub-assembly is shown in FIGS. 9 and 10. Again, for ease of reference and purposes of brevity, like reference numerals will refer to like components while new reference numerals will identify new components. Here, the primary door seal PS and inner garnish trim IG are interconnected in the same manner as shown and described with reference to FIGS. 7 and 8. That is, leg 120 of the trim cooperates with shoulder 122 of one of the legs of the primary door seal base 102 to provide a snap-fit connection between the connecting leg 94 of the inner garnish trim with the spaced legs 102a, 102b of the primary door seal. This inner garnish trim/primary door seal subassembly is then secured to the door with tape 124. Particularly, a double sided tape is secured on a first face to an underside of leg 102b of the base of the primary door seal and a second face is secured to the metal surface of the door. The primary area of distinction resides in the manner in which the inner garnish trim/primary door seal sub-assembly interconnects and cooperates with the glass run GR. Whereas the seal lips 66 in the prior described embodiments all were integrally formed or formed as a part of the glass run extrusion process and extended outwardly from the glass run, in FIGS. 9 and 10, an secondary inner glass seal GS is provided by outermost seal lip 130 that extends outwardly from a modified end 132 of the inner garnish. Thus, while seal lips 66 still extend from the base 60 and first leg 62 of the glass run portion, seal lip 130 is connected with the secondary inner glass seal that extends from end 132 of the inner garnish trim. Ultimately, the inner garnish end 132 forms a snap-fit arrangement with the seal lip portion 130 so that secondary seal 130 is properly secured and located relative to the window W.

Figure 11:
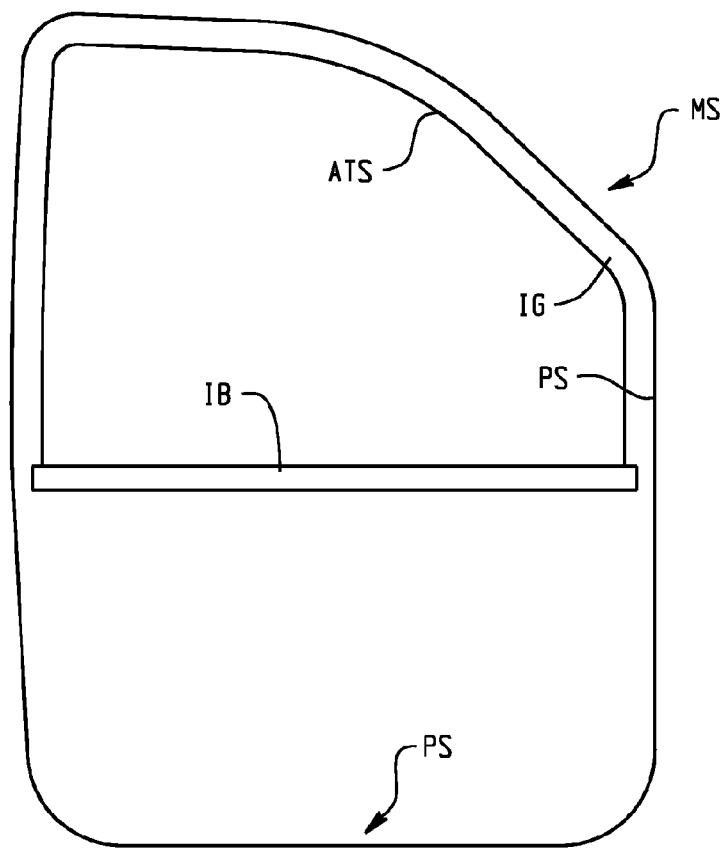
FIG. 11 is a plan view of a second preferred embodiment of an inner garnish assembly module system incorporating an anti-trap switch.
Figure 12:
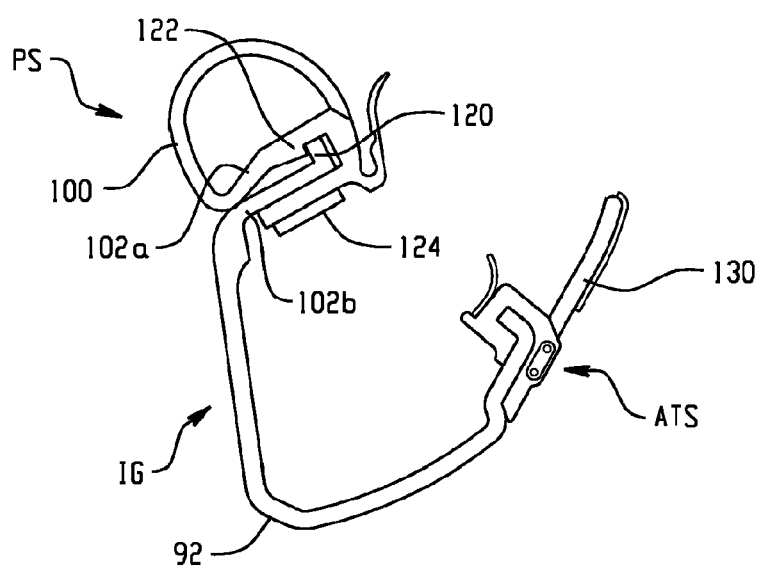
FIG. 12 is a cross-sectional view of the inner garnish/primary seal subassembly with anti-trap switch taken generally along the lines 12-12 of FIG. 11.

FIGS. 11 and 12 are generally related to the third preferred embodiment of FIGS. 9 and 10. The only additional modification is the incorporation of an anti-trap or anti-pinch switch/sensor ATS into the secondary inner glass seal/inner garnish trim interface. Particularly, the anti-trap switch is shown in FIG. 11 as extending along the entire inner peripheral portion of the garnish, i.e., along the A-pillar and B-pillar and along the header portion. The switch is preferably incorporated into the modified secondary seal lip 130 that extends from the inner glass seal provided at one end of the inner garnish leg 132. The particular details of the anti-trap switch are generally well-known in the art, for example as shown and described in commonly owned WO2007/022355, so that further discussion herein is deemed unnecessary. However, as perhaps best evident in FIGS. 11 and 12, the modified primary seal PS, inner garnish IG, inner glass secondary seal GS assembly referenced as module system MS illustrates how easily the anti-trap switch ATS can be incorporated into the arrangement and disposed closely adjacent the region in which the window is received into the glass run. This is particularly important since this is a potential area of pinching that could occur if an object is inadvertently trapped between the window when the window is raised relative to the glass run.

Figure 13:
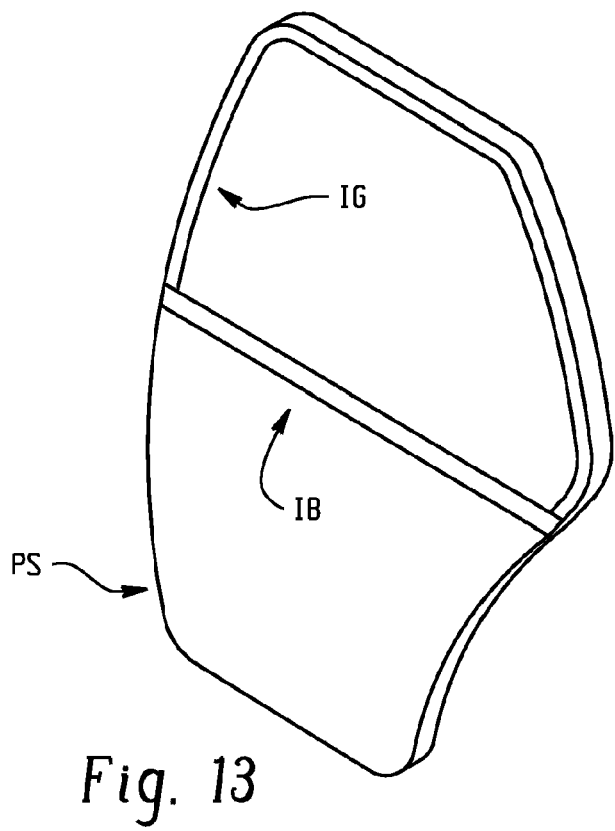
FIG. 13 is a perspective view of an interior trim module for a rear door.
Figure 14:
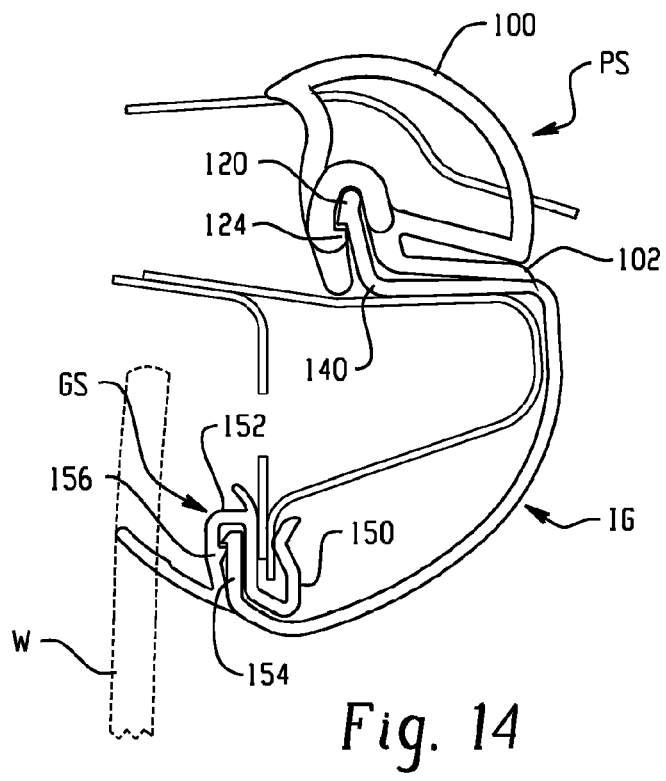
FIG. 14 is a cross-sectional view taken generally along the lines 14-14 of FIG. 13.

FIGS. 13 and 14 show another arrangement of the primary door seal PS connected to an inner garnish trim IG and incorporating a secondary inner glass seal GS. The configuration of the inner garnish trim and the door seal interconnection is slightly modified, but still employs a mechanical engagement between the door seal and inner garnish trim. Only one leg is provided along the base of the seal and the interconnection with the garnish trim undergoes an additional turn 140 of approximately ninety degrees from the arrangement of FIGS. 7 and 8, for example. No tape or fastener is provided along the interface with the door in this region. On the other hand, the secondary inner glass seal GS is slightly modified form the arrangement of FIGS. 9 and 10. More particularly, the secondary inner glass seal has an S-shape where one portion 150 of the s-shape engages a door flange to secure the subassembly to the associated vehicle door. The other portion 152 of the s-shape receives a retaining leg 154 of the inner garnish trim that cooperates with shoulder 156 to retain the inner garnish trim IG to the secondary glass seal GS.

It will be appreciated by one skilled in the art that a corresponding method of assembling an inner garnish trim module includes providing an inner garnish trim and joining a primary door seal thereto to form a subassembly prior to installing the subassembly to an associated vehicle door. The method can include mechanically joining the inner garnish trim to the primary door seal such as by using pins to join the inner garnish trim to the primary door seal. The pins or a tape can then be used to secure the subassembly to the associated vehicle door. An inner glass secondary seal can be easily joined to the module system or subassembly as described above. Likewise, an anti-trap sensor/switch assembly can be incorporated into the inner glass secondary seal, and/or a belt line seal joined to the module system.

The invention has been described with reference to the preferred embodiment. Modifications and alterations will occur to others upon reading and understanding this specification. It is intended to include all such modifications and alterations in so far as they come within the scope of the appended claims or the equivalents thereof.

What is claimed is:

1. An inner interior garnish assembly module system for an associated vehicle comprising:
   an inner garnish trim; and
   a primary door seal mechanically joined to the inner garnish trim as a subassembly prior to installation of the module system on an associated vehicle door via the same mechanical connector, the inner garnish trim and primary door seal joined via a first portion of the mechanical connector to form the subassembly, and the subassembly joined to the associated vehicle door via a second portion of the mechanical connector.

2. The system of claim 1 wherein the inner garnish trim extends along first and second pillar portions and an interconnecting header portion.

3. The system of claim 1 wherein the subassembly includes an adhesive to secure the subassembly to the associated vehicle door.

4. The system of claim 3 wherein the adhesive includes tape is preferably located between the primary door seal and the associated vehicle door adjacent an interconnection between the inner garnish trim and the primary door seal.

5. The system of claim 1 wherein the inner garnish trim is further mechanically engaged to the associated vehicle door at a location spaced from the primary door seal.

6. An inner interior garnish assembly module system for an associated vehicle comprising:
   an inner garnish trim; and
   a primary door seal mechanically joined to the inner garnish trim as a subassembly prior to installation of the module system on an associated vehicle door, wherein the inner garnish trim and the primary door seal are connected together with pins to form a subassembly, and the pins also secure the subassembly to the associated vehicle door.

7. The system of claim 6 wherein the pins are connected to the primary door seal and then the inner garnish trim is secured to the primary door seal via the pins to form the subassembly prior to the pins securing the subassembly to the associated vehicle door.

8. The system of claim 1 further comprising an inner glass secondary seal secured to the module system.

9. The system of claim 8 wherein the inner glass secondary seal is secured to the inner garnish trim at a region spaced from the primary door seal.

10. The system of claim 8 wherein the inner glass secondary seal includes at least one seal lip mounted for sliding sealing engagement with an inner surface of an associated window.

11. The system of claim 10 further comprising an anti-trap sensor/switch assembly incorporated into the inner glass secondary seal adjacent the seal lip thereof.

12. The system of claim 8 further comprising an anti-trap sensor/switch assembly incorporated into the inner glass secondary seal.

13. The system of claim 8 wherein the inner glass secondary seal is mounted to the associated vehicle door adjacent a glass run portion that has a base region and first and second legs extending outwardly from the base region in a generally U-shaped configuration.

14. The system of claim 1 further comprising an inner beltline weatherstrip joined to the inner garnish trim and primary door seal.

15. A method of assembling an inner garnish trim module comprises:
   providing an inner garnish trim; and
   joining a primary door seal to the inner garnish trim to form a subassembly prior to installing the subassembly to an associated vehicle door;
   using pins to join the inner garnish trim to the primary door seal; and
   using the pins to secure the subassembly to the associated vehicle door.

16. The method of claim 15 further comprising joining an inner glass secondary seal to the module.

17. The method of claim 16 further comprising incorporating an anti-trap sensor/switch assembly into the inner glass secondary seal.

18. The method of claim 15 further comprising joining a belt line seal to the module.

* * * * *